United States Patent [19]

Kauffman

[11] Patent Number: 5,090,718
[45] Date of Patent: Feb. 25, 1992

[54] MULTI-FUNCTION TOWING TRAILER

[76] Inventor: Frank Kauffman, 1506 College Ave., Goshen, Ind. 46526

[21] Appl. No.: 643,274

[22] Filed: Jan. 22, 1991

Related U.S. Application Data

[63] Continuation of Ser. No. 307,672, Feb. 6, 1989, Pat. No. 5,016,897.

[51] Int. Cl.$^5$ ............................................. B60P 3/06
[52] U.S. Cl. .................................. 280/402; 280/407; 280/482; 410/7; 414/485
[58] Field of Search ................... 280/402, 407, 482; 140/7, 23; 414/485, 537, 563

[56] References Cited

U.S. PATENT DOCUMENTS

| | | | |
|---|---|---|---|
| 2,628,733 | 2/1953 | Hale | 280/402 |
| 3,011,800 | 12/1961 | Mitsuyasu | 280/452 |
| 3,613,821 | 10/1971 | Ryden | 414/430 |
| 4,493,491 | 1/1985 | Karlik | 280/402 |
| 4,509,769 | 4/1985 | Weber | 280/491.1 |

FOREIGN PATENT DOCUMENTS 677437 8/1952 United Kingdom ................ 280/402

*Primary Examiner*—Kenneth R. Rice
*Attorney, Agent, or Firm*—Woodard, Emhardt, Naughton, Moriarty & McNett

[57] ABSTRACT

A towing carriage includes a double H shaped frame having a longitudinal axis and a pair of parallel tubular members transverse to the longitudinal axis. A pair of angle irons are affixed longitudinally between the tubular members. An axle assembly is supported by axle supports affixed to the angle irons. The axle assembly includes a pair of wheels situated so that the tubular members straddle the wheels. A channel beam is affixed to the front tubular member with a downward facing channel opening. A tow bar is pivotably mounted within the channel opening and extends longitudinally forward toward the towing vehicle. A hitch cup is provided at the forward endd of the tow bar to mate with a trailer hitch on the towing vehicle. A pivot pin passes through the tow bar and channel beam to restrain relative rotation between the tow bar and the carriage frame. In one aspect, a pair of wheel ramps are provided with mounting posts arranged to fit within the transverse openings of the tubular members. Each of the wheel ramps includes a drive up ramp leading to a wheel well for supporting the front wheels of a vehicle to be towed. The wheel ramps can be tilted, along with the carriage frame, to a loading position when the tilt pin is removed. The frame and wheel ramps tilt automatically into a generally horizontal orientation as the towed vehicle drives up the ramp. A draw bar is provided that is rotationally mounted at its front end to the front end of the tow bar and rotationally engaged, via a universal joint, at its aft end to the towed vehicle. The draw bar provides lateral or sway stability while accomodating relative movement between the towed vehicle and the towing carriage when negotiating a turn. In another aspect, a utility trailer includes a pair of base halves, each having attachment posts for mating with the tubular members of the towing carriage.

4 Claims, 5 Drawing Sheets

MULTI-FUNCTION TOWING TRAILER

This application is a continuation of application Ser. No. 307,672, filed 2/6/89 now U.S. Pat. No. 5,016,897.

BACKGROUND OF THE INVENTION

This invention relates to a device for towing vehicles and, in particular, to a carriage or trailer for towing the vehicles by engaging and lifting a set of wheels of the vehicle. The invention also concerns a multi-function carriage that can be converted easily into a utility trailer or similar device.

Many conventional towing devices lift and pull a vehicle by hooking a chain or a sling to the vehicle bumper, axle or undercarriage. Devices of this nature are generally restricted to use by wrecker services for towing disabled vehicles. Another typical towing device consists primarily of a tow bar mounted between a trailer hitch, attached to the towing vehicle, and a mounting bracket, attached to the towed vehicle. Devices of this nature are frequently used to tow operable vehicles, for instance, when an automobile is towed behind a recreational vehicle or truck. In this instance, the towed vehicle is pulled behind the towing vehicle with all four wheels in contact with the ground. However, certain automobile manufacturers refuse to warrant the vehicles towed in this manner.

An alternative type of device raises the car by supporting the front or rear wheels of the automobile off the ground. This alternative device includes its own set of ground engaging wheels for providing the necessary support for the towed vehicle. One disadvantage of these devices is that they provide inadequate lateral stability for side-to-side motion of the towed vehicle, particularly when negotiating a turn. Some of these devices, such as that described in the patent to Porter, Sr., et al., U.S. Pat. No. 4,573,857, use straps engaged about the wheels to hold the wheels in place. These wheel straps are typically cumbersome and difficult for many people, such as the handicapped or elderly, to attach. Further, there is a tendency for the straps to work loose when the towed vehicle is pulled around a corner because the vehicle wheels have a tendency to shift longitudinally and laterally as the turn is made.

Another difficulty with many of the prior art devices is that they involve fairly complicated and heavy frame structures so that it is difficulty to maneuver the towed vehicle onto the device. In addition, many of these devices have the towing device wheels outboard of the towed vehicle wheels, so that the towing device is relatively wide and difficult for the driver of the towing vehicle to keep on the road. Another problem of the prior art towing devices is that complicated mechanisms are provided for steering of the towing device when the towing vehicle negotiates a turn.

In view of the difficulties and limitations of the prior art towing devices, it is desirable to provide a towing device that is lightweight, easy to control while driving, and easy to maneuver a towed vehicle thereon. It is also important that the device provide adequate lateral stability of the towed vehicle to prevent excessive sway or yaw when negotiating a turn, yet permit longitudinal and lateral shifting of the vehicle wheels. It is also desirable that the device be lightweight, multi-functional and easy to manipulate and store.

DESCRIPTION OF THE PREFERRED EMBODIMENTS

Figure 1:
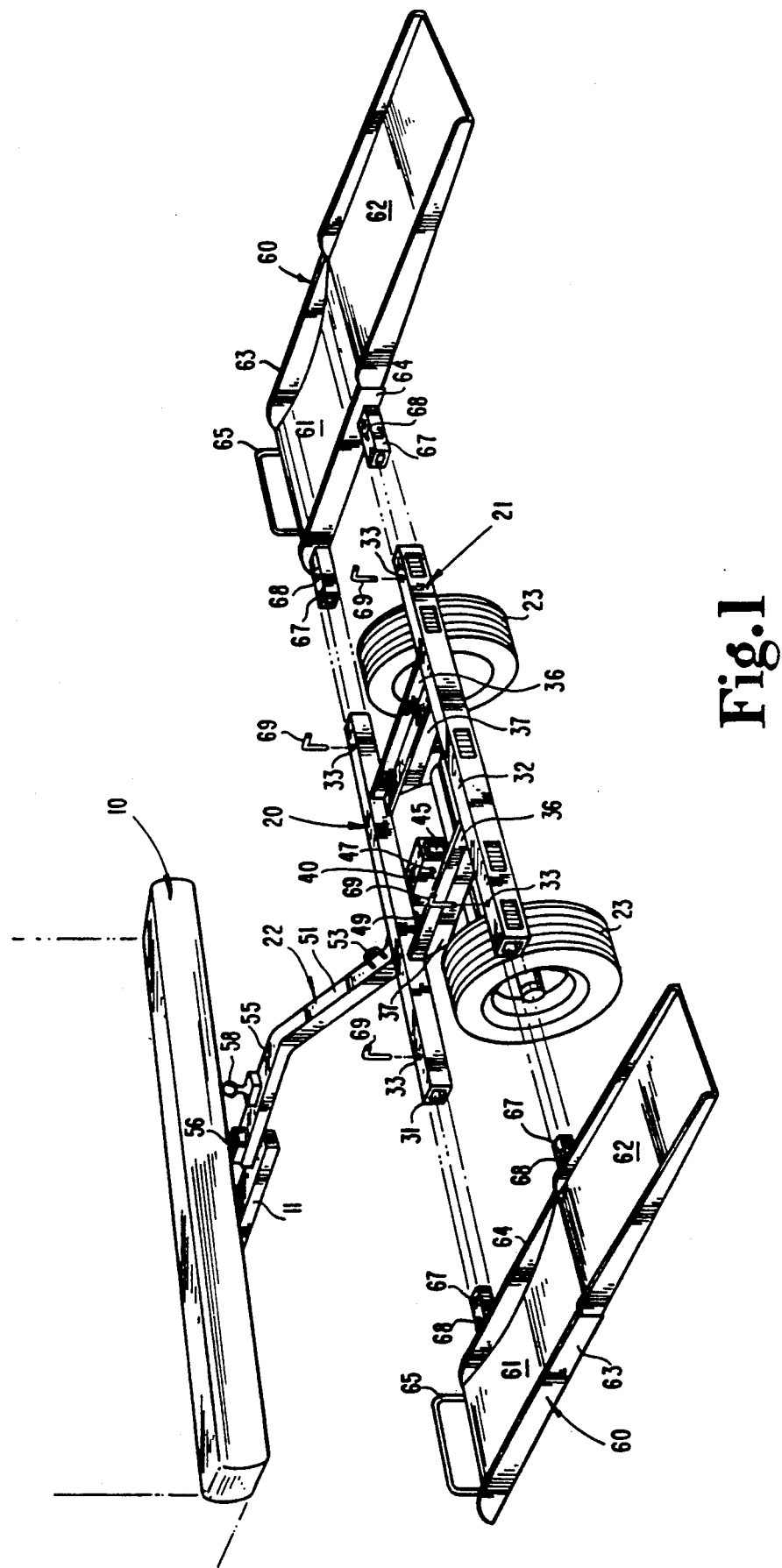
FIG. 1 is a perspective view of a multi-function towing device of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

A towing vehicle 10, such as a recreational vehicle (RV), includes a trailer hitch 11 mounted to the undercarriage of the RV. A towing carriage or trailer 20 is engaged on the trailer hitch 11 as described herein. The towing carriage includes a frame 21 with a tow bar 22 projecting perpendicularly forward from the front end of the frame 21. A pair of wheels 23 are mounted on an axle assembly 24 which is fixed on the frame 21. The wheels 23 are situated entirely within the lateral sides of the frame 21 for reasons described herein.

The frame 21 of the towing carriage 20 is in the shape of a double "H" with a pair of tubular members 31 and 32 straddling the wheels 23. The tubular members 31 and 32 are equidistant from a midline ML oriented transversely to the longitudinal axis of the carriage. A pair of angle irons 36 extend in the direction of the longitudinal axis of the towing carriage 20 and are affixed to and extend between the tubular members 31 and 32 inboard of the wheels 23. In the preferred embodiment, the angle irons are welded to the tubular members, as are the remaining elements of the carriage structure. Each of the angle irons 36 includes an axle mount 37 onto which the axle assembly 24 is affixed. The axle assembly 24 can be of the type commercially available as Model No. 1500 of the Dexter Company of Elkhart, Ind., which has an axle embedded within a rubber sleeve that provides torsional resistance to twisting of the axle, in lieu of springs or shock absorbers in the towing carriage 20. In the preferred embodiment, the axle assembly 24 includes a pair of struts 25 to offset the wheel axis A to a position longitudinally aft of the midline ML to facilitate loading the towing carriage as explained herein. Alternatively, a single axle may extend between the hubs of the wheels 23 in a standard fashion known in the art, provided that the wheel axis A is aft of the midline ML.

Figure 3:
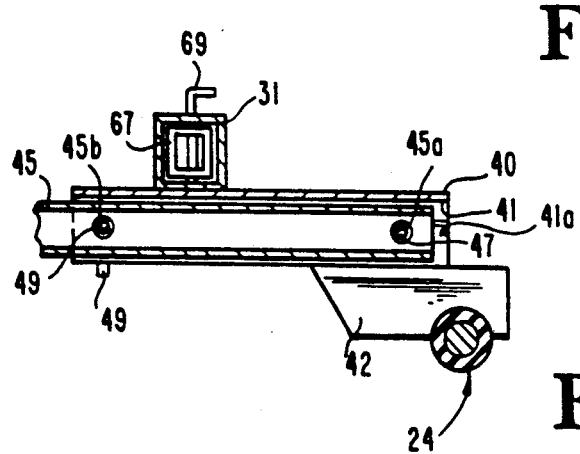
FIG. 3 is an enlarged side cross-sectional view taken along line 3—3 in FIG. 2 as viewed in the direction of the arrows.

A channel beam 40 is engaged or welded to the underside of the front tubular member 31. The channel beam 40 includes a downwardly facing channel 41 between channel walls 41a and 41b, as shown in FIGS. 1 and 3. Integral from each of the channel walls are axle support plates 42 that extend downwardly and rearwardly from the channel beam 40 to provide support for the axle assembly 24 at the middle of the axle assembly.

Figure 2:
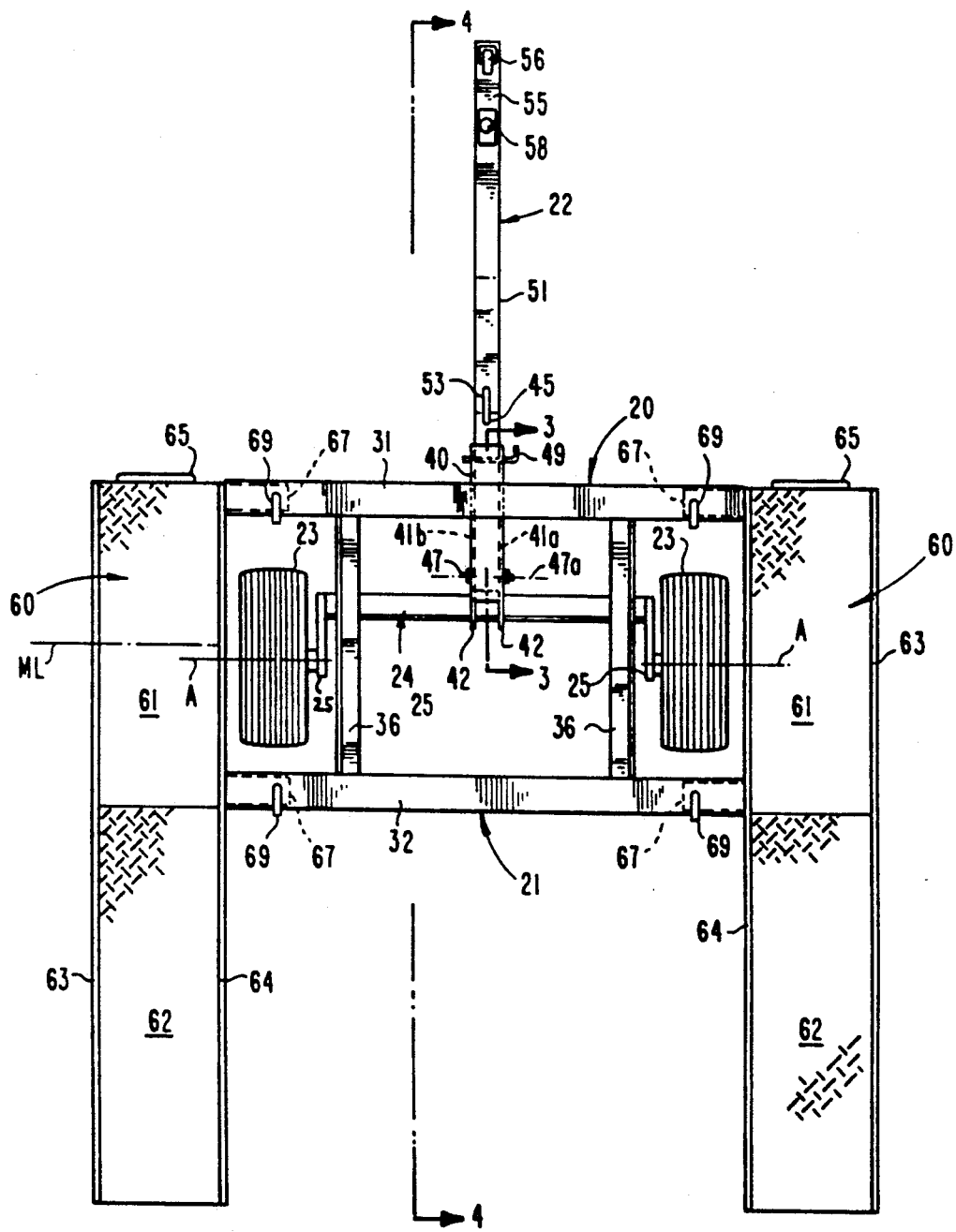
FIG. 2 is a top elevational view of the towing device of FIG. 1.

The tow bar 22 is mounted between the trailer hitch and the channel beam as shown in FIGS. 1–3. The tow bar 22 includes a support segment 45 that fits within the channel 41 of the channel beam 40. The support segment 45 includes a pair of transverse openings 45a and 45b through the tow bar 22. The rear end of the tow bar 22 is pivotably mounted to the channel beam 40 by way of a pivot bolt 47 extending through the opening 45a of the support segment and openings 43 through the walls 41a and 41b. The pivot bolt connection is sufficiently loose to allow the tow bar to rotate relative to the channel beam along a pivot axis 47a passing through the length of the bolt 47. A tilt pin 49 passes through openings 44 in the channel walls and opening 45b in the support segment 45 at a position forward of the pivot axis 47a. When the tilt pin is so engaged, the tow bar is held against rotation about the pivot axis 47a. Conversely, the two bar is allowed to pivot when the tilt pin is removed.

The support segment 45 of the tow bar 22 extends forward into a goose neck segment 51 onto which a tie down ring 53 is attached. The goose neck segment extends into a hitch segment 55 that terminates in a hitch cup 56 for engaging the trailer hitch 11 of the towing vehicle 10. The hitch segment 55 also includes a mounting ball 58 projecting vertically upward from the hitch segment, for use as described herein. The goose neck segment 51 between the hitch segment and the support segment allows the towing carriage 20 to be situated more closely to the ground than the rear bumper of the towing vehicle 10. This is a benefit when the towed vehicle is situated on the towing carriage 20 so that the loading angle is shallow and the towing angle is as low as possible to prevent the rear bumper of the towed vehicle from contacting the ground.

In its use as a vehicle towing device, the towing carriage 20 includes left and right wheel ramps 60 that are removably engaged with the frame 21. Each wheel ramp 60 includes a wheel well 61 which support the front wheels of the towed vehicle, and an inclined drive up ramp 62. Some lateral restraint for the towed vehicle wheels are provided by the outboard walls 63 and the inboard walls 64 of the wheel ramps 60. A wheel stop 65 is provided at the front end of the wheel ramps to prevent the vehicle from being driven over the end of the wheel ramps 60. Each of the wheel ramps 60 includes a pair of spaced apart mounting posts 67, extending through the inboard walls 64 of the ramps. In the preferred embodiment, as shown in FIG. 2, the mounting posts extend underneath or form part of the wheel well 61 to provide additional support for the front and rear portions of the wheel well. The longitudinal spacing of the mounting posts 67 corresponds to the orientation of the tubular members 31 and 32.

The mounting posts 67 are inserted into the open ends of the tubular members 31 and 32 until openings 68 in the mounting posts are aligned with openings 33 in the top and bottom walls of the tubular members 31 and 32. Locking pins 69 are inserted through the openings 33 and the opening 68 in the mounting posts 67 to couple the wheel ramps 60 to the carriage 20. In the preferred embodiment, each of the mounting posts has a cross-section only slightly smaller than the openings in the tubular memebrs to provide a snug fit between the components.

The towing carriage 20 of the present invention may be quickly and easily disassembled into small, easy to store components. The tow bar 22 can be removed from the channel beam 40 by removing the tilt pin 49 and pivot bolt 47. The wheel ramps 60 can be removed by pulling the four locking pins 69 and sliding the mounting posts 67 from the front and rear tubular members 31 and 32. In the preferred embodiment, the tubular members 31 and 32 and the tow bar 22 are composed of 2½ inch square steel tubing. The frame 21 of the towing carriage 20 is approximately 46 inches wide and 30 inches long. The length of the tow bar 22 can be varied depending upon the front end length of the automobile to be towed, as well as the external features of the towing vehicle 10. In the preferred embodiment, all of the components are composed of steel or stainless steel.

Figure 4:
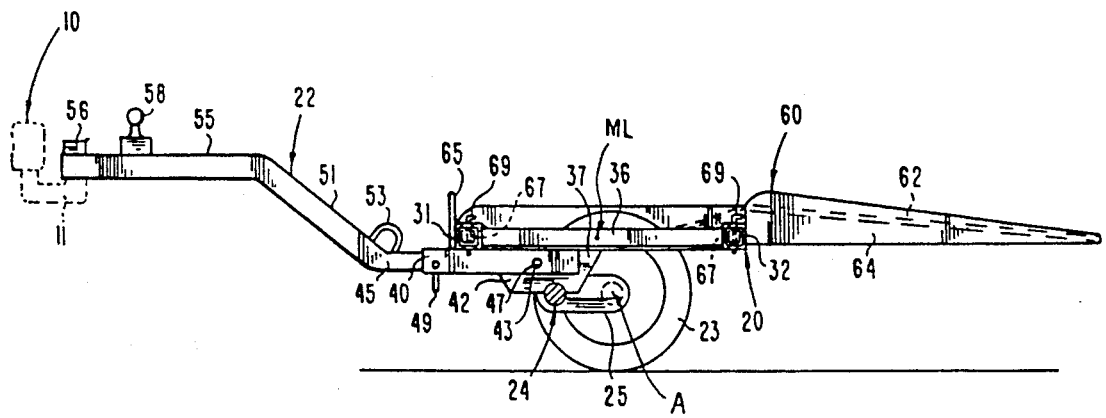
FIG. 4 is a side cross-sectional view of the towing device taken along line 4—4 in FIG. 2 as viewed in the direction of the arrows.
Figure 5:
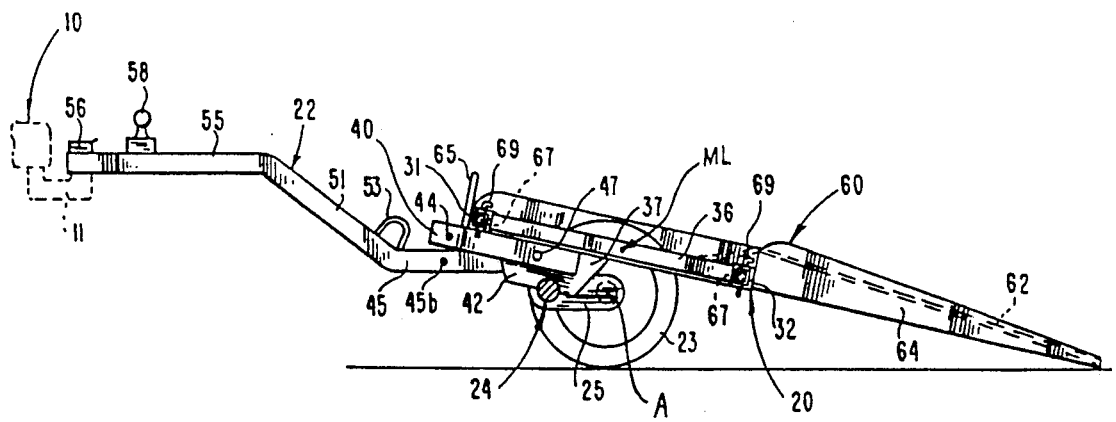
FIG. 5 is a side view of the towing device as shown in FIG. 4, with the device tilted to allow a towed vehicle to be driven thereon.

Referring now to FIGS. 4 and 5, one aspect of the present invention is as illustrated that allows for easy loading and unloading of a vehicle onto the towing carriage. In the normal towing configuration, as shown in FIG. 4, the pivot bolt 47 and tilt pin 49 retain the frame 21 of the towing carriage, as well as the wheel ramps connected thereto, in a generally horizontal arrangement. When the tilt pin 49 is removed, as shown in FIG. 5, the frame 21 and wheel ramp 60 are free to tilt until the rear edges of the drive up ramps 62 contact the ground. Since the center of gravity of the frame 21 and wheel ramps 60 is behind the pivot bolt 47, the frame will automatically tilt once the tilt pin 49 is removed. In the preferred embodiment, the drive up ramps 62 nominally subtend a loading angle of about 15° relative to the ground.

In the loading position, shown in FIG. 5, the towed vehicle (vehicle 15 in FIG. 6) can be driven up the wheel ramps 60 until the wheels of the towed vehicle are engaged within the wheel wells 61 with the front axle of the towed vehicle generally above the midline ML. Once the towed vehicle wheels are within the wheel wells, the weight of the towed vehicle naturally tilts the towing carriage frame 21 downward relative to the channel beam 40 until the openings 43 in the channel walls 41a and 41b align with the opening 45b through the support segment 45 of the tow bar 22. With the towed vehicle wheels in the wheel wells, the carriage has a tendency to pivot about the wheel axis A of the carriage wheels 23, which allows the channel beam 40 to pivot into contact with the tow bar 22. At that time, the tilt pin 49 can be reinserted to lock the tow bar 22 in engagement with the frame 21. When the towed vehicle is to be driven off of the towing carriage 20, the tilt pin 49 can be removed and the vehicle driven back along the wheel ramp 60 so that the frame 21 and wheel ramps 60 tilt until the rear edge of the drive up ramps 62 contact the ground.

Figure 6:
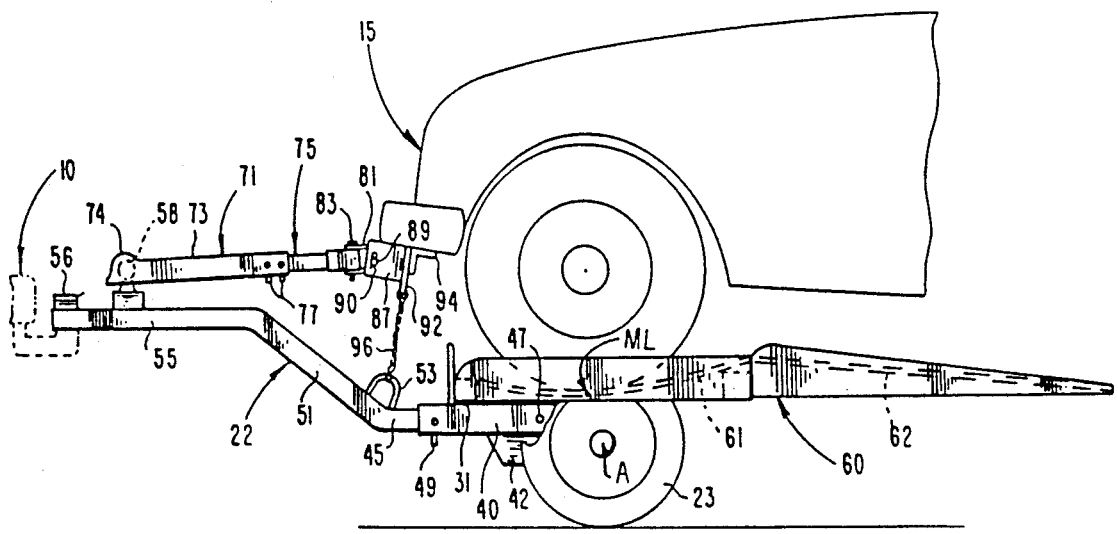
FIG. 6 is a side elevational view of the towing device with a vehicle mounted thereon, and including a draw bar for providing lateral support, as in one embodiment of the present invention.
Figure 7:
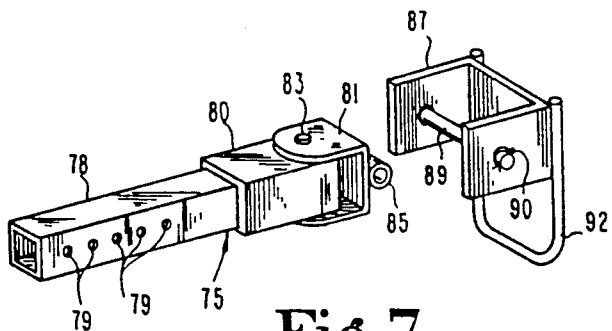
FIG. 7 is a perspective view of a portion of the draw bar assembly shown in FIG. 6.

In another aspect of the present invention, a draw bar assembly 71, as shown in FIG. 6, is included to firmly mount the towed automobile 15 on the towing carriage 20, yet permit movement of the automobile relative to the carriage when the towing vehicle, trailer and towed vehicle are steered around a corner. The draw bar assembly 71 includes a pivot bar 73 that terminates at its forward end in a mounting cup 74. The mounting cup 74 fits over the mounting ball 58 on the hitch segment 55 of the tow bar 22. The pivot bar 73 can be tubular or channel-shaped with the opening of the channel facing downwardly. The draw bar assembly 71 includes a U-joint bar 75 that is adjustably connected to the pivot bar 73 by a pair of pins 77, which in the preferred embodiment are L-shaped pins but may also be a bolt or other similar fastening device. The U-joint bar 75 includes an adjustment tube 78 that fits within the tube or channel opening of the pivot bar 73. The adjustment tube 78 includes a number of laterally extending adjustment holes 79. A pair of the adjustment holes 79 are aligned with a pair of holes in the pivot bar 73 with the pins 77 extending therethrough to connect the U-joint bar with the pivot bar.

A U-shaped bracket 81 is pivotably connected to the head 80 of the U-joint bar 75 by a U-joint pivot bolt 83 or pin. The U-shaped bracket is pivotable about the U-joint pivot 83 in a generally horizontal direction. The U-shaped bracket 81 includes a cylindrical collar 85 affixed to the rear surface of the U-shaped bracket 81. The collar 85 is adapted to fit within a pivot bracket 87, with a spindle 89 passing through openings in the pivot bracket and through the collar 85. A pair of cotter pins 90 at each end of the spindle 89 retain the spindle assembly in place.

The pivot bracket 87 is mounted to the automobile 15 by way of a mounting brace or bracket 94 that is preferably bolted to the underside of the automobile bumper. Fixed to the pivot bracket 87 is a tie-down loop 92 that extends downwardly from the automobile bumper when the draw bar assembly 71 is in use. A tie-down chain 96 is connected between the tie-down loop 92 and the tie-down ring 53 attached to the tow bar 22. The chain 96 provides vertical restraint to restrict the vertical motion of the towed automobile 15 when the towing carriage 20 passes over a bump, for example, and also acts as a safety chain. Thus, if the ball and socket connection 58 and 74 come loose, the chain 96 retains the vehicle 15 on the trailer 20.

The draw bar assembly 71 accomodates multiple degree of freedom rotation between the towed vehicle and the towing carriage or trailer as may occur when negotiating a turn or passing over a bump. The pivot bar 73 can rotate about the mounting ball 58, either for vertical or horizontal rotation. The U-shaped bracket, as previously indicated, can rotate in a generally horizontal plane about the U-joint pivot 83. Finally, the pivot bracket 87 can rotate relative to the collar 85 about the spindle 89 so that the entire draw bar assembly 71 can pivot in a vertical plane relative to the vehicle 15. In one example of the use of the invention, the towed vehicle is a front-wheel drive automobile with the front wheels being steerable and supported on the trailer 20. The towed automobile steering is left unlocked and the vehicle placed in neutral in order to allow the towed front automobile wheels to turn slightly as the towing carriage and towed vehicle 15 turn when rounding a corner.

Figure 8:
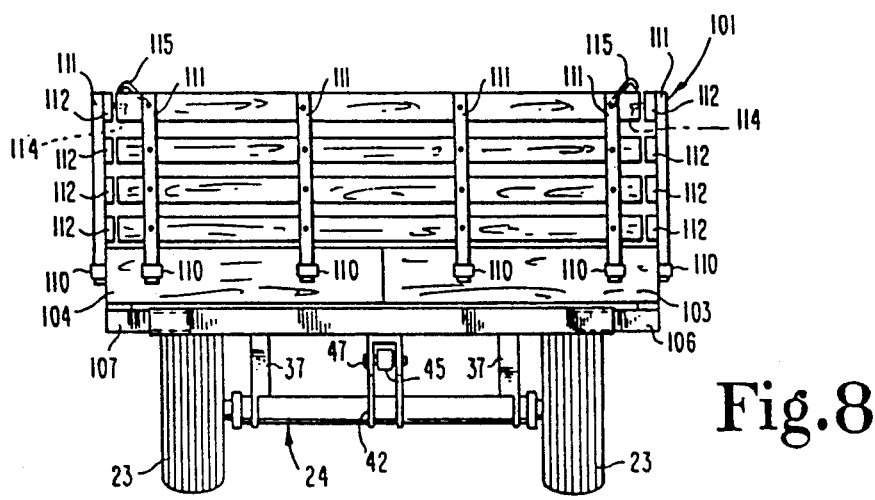
FIG. 8 is a rear elevational view of the towing device in another embodiment of the invention for use as a utility trailer.
Figure 9:
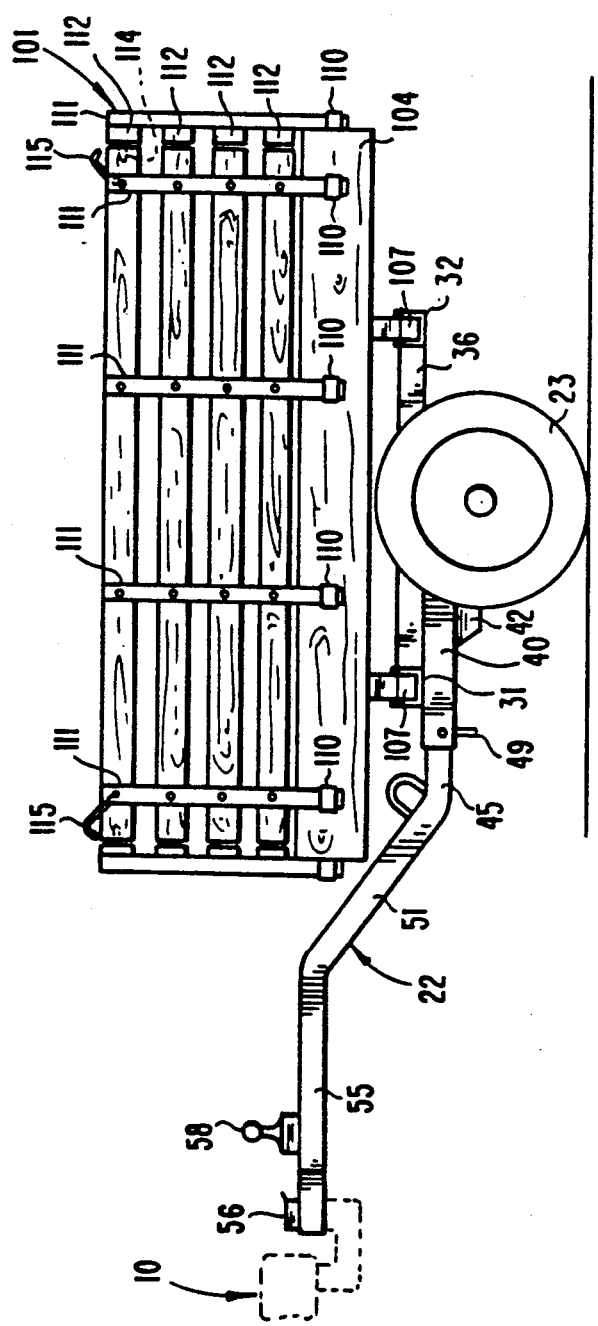
FIG. 9 is a side elevational view of the embodiment shown in FIG. 8.

Another application of the multi-functional towing carriage 20 is illustrated in FIGS. 8 and 9 in which the carriage is used as a utility trailer 101. The utility trailer 101 includes a pair of base halves 103 and 104. The base halves 103 and 104 form the floor of the utility trailer. Each half includes a pair of attachment posts 106 and 107, respectively, that are arranged to correspond with the front and rear tubular members 31 and 32 of the towing carriage frame 21. Each of the sets of attachment posts 106 and 107 are inserted into the openings of the tubular members 31 to support the base halves over the towing carriage frame 21. The attachment posts 106 and 107 are inserted into the tubular members until the inboard sides of the base halves 103 and 104 contact.

Each of the base halves include a number of stake pockets 110 spaced around the perimeter of the base. Fence stakes 111 onto which fence slates 112 are affixed, are mounted within the stake pockets 110. Since the fence slats 112 extend across the entire width of the utility trailer, the fence slats and fence stakes provide a means to hold the base halves 103 and 104 together. Thus, with the fence elements in position, the base halves cannot be separated and the attachment posts 106 and 107 cannot be removed from the tubular members 31 and 32. In order to preserve the integrity of the utility trailer, an eye 114 and hook 115 are provided between adjacent fence sections to interconnect each of the sides of the utility trailer. In this embodiment, the towing carriage 20 and tow bar 22 are as described above. However, the wheel ramps 60 are eliminated, as well as the tie-down chain 96 and the draw bar assembly 71.

As is seen from the foregoing description, the towing carriage 20 of the present invention is easy to assemble and versatile in use. The towing carriage 20 can be used to support a pair of wheel ramps 60 onto which a towed automobile 15 can be supported. Likewise, the wheel ramps 60 can be removed and the utility trailer base halves 103 and 104 can be mounted onto the towing carriage to provide a utility trailer. Whether the towing carriage 20 functions as a vehicle towing device or as a utility trailer, each of the elements of the towing carriage can be conveniently broken down for easy storage. Since all of the removable or adjustable components are pin-engaged, no sophisticated tools or mechanisms are required in order to assemble the carriage or in order to put the carriage to use in one of the two functions.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A vehicle towing apparatus for detachable connection to a towing vehicle, comprising:
 a carriage having a longitudinal axis including;
  an elongated beam member extending in parallel with said longitudinal axis;
  a non-steerable wheel assembly fixed to said beam member, said wheel assembly including a pair of rotatable ground engaging wheels;
  a pair of parallel tubular members affixed transversely to said beam member and straddling each of said ground engaging wheels; and a channel beam affixed to a forward one of said pair of tubular members, said channel beam including a downwardly opening channel having a pair of opposing channel walls;

wheel supporting means for supporting a pair of wheels of a vehicle to be towed, said wheel supporting means including;

a pair of elongated ramps, each of said pair of ramps having a wheel well at a forward portion of said ramp for receiving a wheel of the towed vehicle thereon and a rear ground engaging edge; and mounting means for mounting each of said pair of ramps to opposite transverse sides of said pair of tubular members outboard of said pair of ground engaging wheels;

an elongated tow bar including means at a forward end of said tow bar for detachably engaging the towing vehicle;

connecting means for removably connecting said tow bar to said carriage with said tow bar at least partially extending between said pair of channel walls, said connecting means including;

a removable pivot pin extending through a rear end of said tow bar and said pair of channel walls, said pivot pin defining a pivot axis about which said carriage pivots relative to said tow bar, whereby said carriage is pivotable about said pivot axis when said tow bar is engaged with the towing vehicle between a loading position in which the rear edge of each of said pair of ramps engages the ground and a towing position in which each of said pair of ramps is generally parallel with the ground; and means for releasably securing said tow bar to said channel beam to prevent pivoting of said carriage relative to said tow bar about said pivot axis.

2. A vehicle towing apparatus for detachable connection to a towing vehicle, comprising:

a carriage for supporting two wheels of a vehicle to be towed;

means for detachably connecting the carriage to the towing vehicle;

means for stabilizing the towed vehicle when supported by said carriage while permitting relative motion between said carriage and the wheels of the towed vehicle and between each of said two wheels, said stabilizing means including;

a draw bar having a forward end and a rear end;

means for removably rotationally connecting said forward end of said draw bar to said carriage adjacent said means for connecting the carriage to the towing vehicle;

means, including a universal joint, for removably rotationally connecting said rear end of said draw bar to the towed vehicle when the vehicle is supported by said carriage.

3. The vehicle towing apparatus of claim 2, further comprising:

a safety chain connected between said universal joint and said carriage.

4. The vehicle towing apparatus of claim 2, wherein said carriage includes a non-steerable wheel assembly having ground engaging wheels for supporting said carriage.

* * * * *